P. F. MURPHY.
FLUSHING DEVICE.
APPLICATION FILED FEB. 4, 1901.
916,758.
Patented Mar. 30, 1909.
2 SHEETS—SHEET 2.
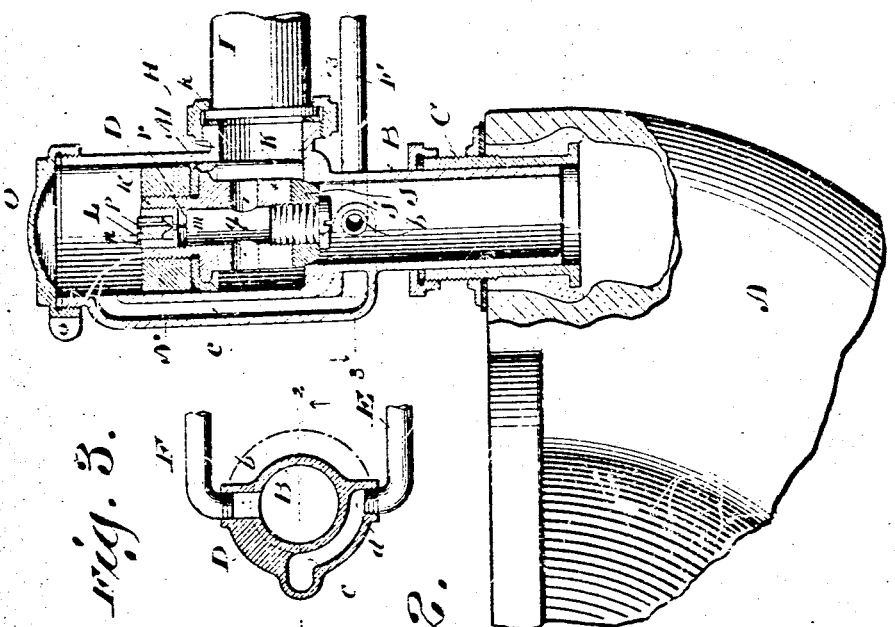
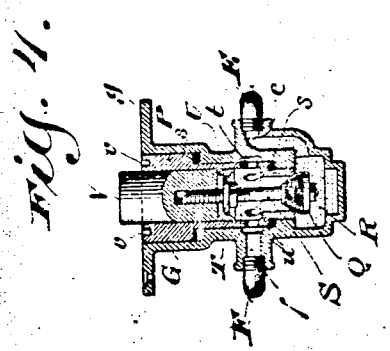
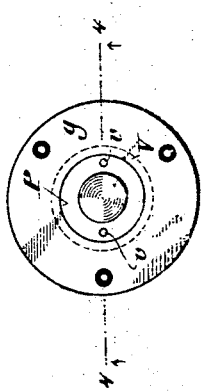
Witnesses:
Geo. W. Young.
B. C. Roloff.
Inventor:
Peter F. Murphy.
By H. G. Underwood
Attorney

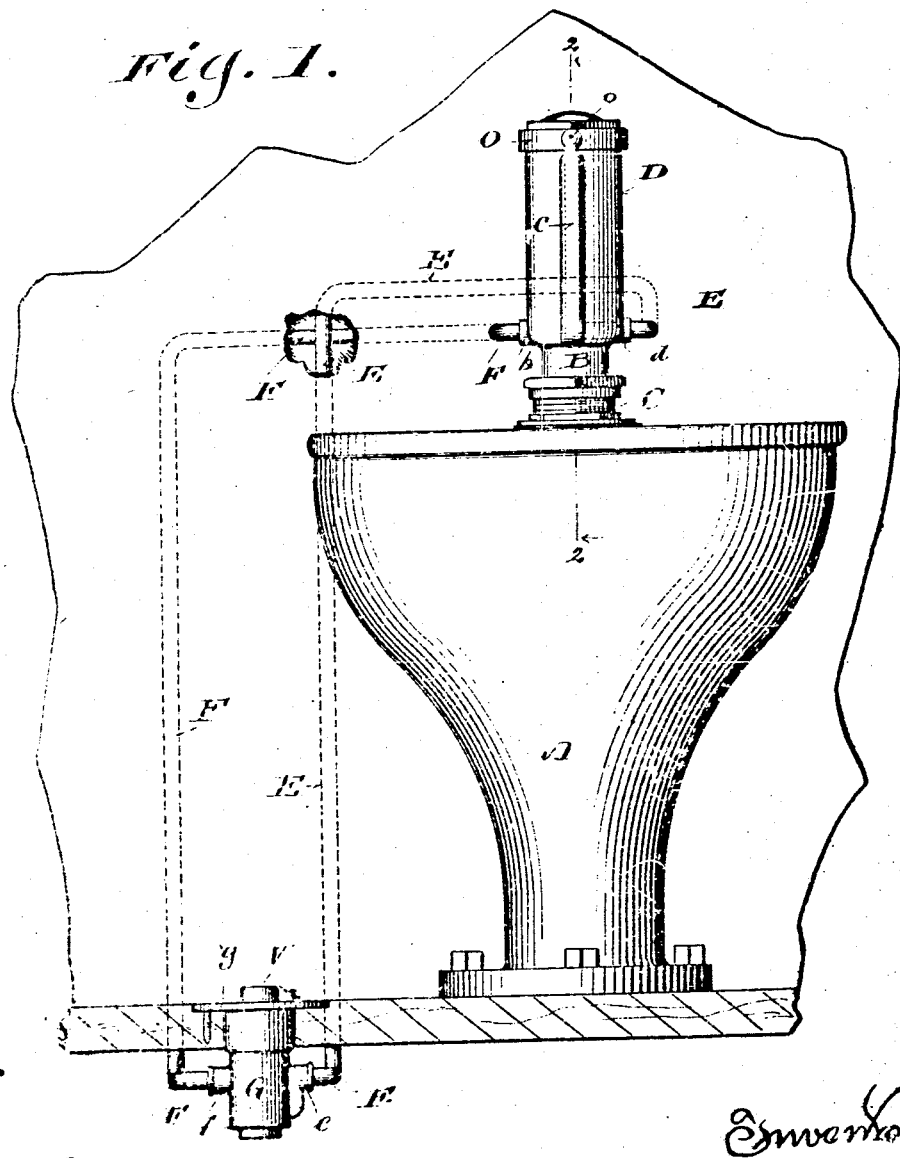

UNITED STATES PATENT OFFICE.

PETER F. MURPHY, OF MILWAUKEE, WISCONSIN.

FLUSHING DEVICE.

No. 916,758.

Specification of Letters Patent.

Patented March 30, 1909.

Application filed February 4, 1901. Serial No. 45,912.

*To all whom it may concern:*

Be it known that I, PETER F. MURPHY, a citizen of the United States, and resident of Milwaukee, in the county of Milwaukee and State of Wisconsin, have invented certain new and useful Improvements in Flushing Devices; and I do hereby declare that the following is a full, clear, and exact description thereof.

My invention has especial reference to flushing devices for closets and urinals not provided with overhead tanks, and it consists in certain peculiarities of construction and combination of parts, as will be fully set forth hereinafter, in connection with the accompanying drawings, and subsequently claimed.

In the said drawings: Figure 1 is a representation, in front elevation, of a water-closet embodying my present invention. Fig. 2 is a vertical sectional view, taken on the plane indicated by the line 2—2, in Figs. 1 and 3. Fig. 3 is a horizontal sectional view, taken on the plane indicated by the line 3—3 in Fig. 2. Fig. 4 is a vertical sectional view of the auxiliary or release valve, and its casing taken on the plane indicated by the line 4—4 in Fig. 5, and Fig. 5 is a plan view, showing the two casings and push-piece of said auxiliary or release valve.

Referring by letter to the drawings, A represents the bowl, and B is a cylinder secured thereto, by means of a suitably packed box or support C, the said cylinder B forming the lower part of the main valve casing D, which casing, adjacent to the upper end of said cylinder B, has a lateral duct or passage $b$ therethrough, from which a pipe F (called the return-pipe) leads to a duct $f$ in the casing G of the auxiliary or release valve shown in Figs. 1 and 4. The casing D of the main valve has a duct $c$, which extends from the upper part of the casing vertically downward to a point in line with the described duct $b$, and thence horizontally around to a point opposite the said duct $b$, terminating in a duct $d$, from which a pipe E (called the flow pipe) leads to a duct $e$ in the said auxiliary valve casing G. The casing D, above the line of the ducts $b$, $d$, is of greater diameter than the cylinder B, and forms a vertical shell, within which the main valve has movement; the vertical part of the duct $c$ is preferably formed within an exterior rib, as best shown in Fig. 1, and on the side opposite thereto is formed the inlet tube H connected by a suitably packed coupling $h$ with the main I leading from the source of water supply under pressure.

The main valve comprises a lower plug J of rubber or analogous material, secured by a screw $j$ to a block K, the lower or main part of which is of considerably less diameter than the interior diameter of the shell or casing D, and the upper part being reduced in diameter, forming a neck $k$. This block K has a central vertical bore $m$ therethrough, screw-threaded at each end, the lower end being closed by the described screw $j$ which secures the plug J to the block, and the upper end being fitted with a cup $n$, having a central hole $r$ through its bottom. The said cup $n$ is formed with interior as well as exterior screw-threads, so as to adjustably receive a needle-valve L, whose function is to regulate the admission of water through the cup-opening $r$, the said needle-valve L having a vertical bore $p$ therethrough. The block K is further formed with a horizontal bore $q$ entirely therethrough, and in free communication with the vertical bore $m$.

M represents a flexible washer or packing-disk, surrounding the neck $k$ of said block, said disk having its periphery turned downward around the upper edge of the block proper, and clamped to place by a block N, of a diameter small enough to move freely within the shell or casing D, said block N having a central screw-threaded bore to receive and engage with the exteriorly screw-threaded neck $k$ of the block K. The top of the casing D is closed by a properly packed cap O, which, as shown, may have a rubber knob $o$ against which the hinged closet-seat, if one is employed, may strike when raised, or the said knob may be located, if preferred, upon the raised rib of the duct $c$, but as this is immaterial, I have not deemed it necessary to show any closet-seat in the drawings.

Referring next to the auxiliary or release valve, the outer casing G of said valve is herein shown as being cast integrally with a plate $g$, and the latter provided with screw-holes whereby it may be readily secured to any desired place, which, in the present illustration, is shown as the floor of the room in which the closet is located, and just in front, and at one side of the bowl A, so as to be operated as a foot valve, although if preferred it may be otherwise located, so as to be operated by hand. P represents an inner casing, or shell, whose exterior surface corresponds generally to the interior surface of the outer casing G, to which it is secured, as by the screw-threaded connection shown in Fig. 4, the joints between the two casings G and P being protected by packing rings s s. The inner casing P has a cylindrical opening therethrough the lower part of which, below the line of the hereinbefore named duct f in the outer casing G, is reduced in diameter, its lower edge forming the seat of the valve-plug Q, and the casing G is formed with an annular recess or channel t in line and communicating with said duct f, and the casing P is formed with an annular series of perforations u u, communicating with said annular recess or channel t. The casing G extends below the line of the casing P so as to form a water-chamber R of greater diameter than the cylindrical bore of the casing P, this chamber R communicating freely with the hereinbefore named duct c. The valve-plug Q is fast on a rod S, the other end of which is screw-threaded to receive a nut T, on which there rests a flexible washer or packing-disk U, whose periphery is turned downward around the upper edge of said nut, said disk being held in place on the valve-rod S, by the push-piece V, the latter being a solid cylinder having a central screw-threaded bore for attachment to the rod S, and being of a length to normally project beyond the plane of the casing plate g, as shown.

The operation of my invention will be readily understood from the foregoing description of its construction, taken in connection with the accompanying drawings, in which the various parts are shown in their relative positions, ready for the flushing operation. As already stated the main I is to be understood as connected with the source of water supply under pressure, such as the water-works of a city, which may, for example, have a pressure of fifty pounds to the square inch. From said main the water under pressure has passed through the bores q and m of the block K of the main valve, and up through the cup-opening r, and the bore p in the needle-valve L into the upper portion of the casing D, filling the space there and flowing out through the ducts c, d, and flow-pipe E to and through duct e in the auxiliary valve casing G and filling the water-chamber R in said casing, which (as all this water is under the described pressure, and as there is no water under any other than atmospheric pressure in the cylinder B, pipe F, and connections) will keep the auxiliary valve-plug Q against its seat at the base of the inner casing P. Now, if it is desired to flush the bowl A, it is only necessary to press the push-piece V, so as to free said auxiliary or release valve plug Q. The moment this is done, the water under pressure will flow up from the water-chamber R into the bore of the casing P and out through the perforations u u, and recess or channel t and duct f into and through the return pipe F and duct b, and down through the cylinder B, and bowl A, causing the water in the upper end of the casing D to flow outward through the duct c, and thereby instantly reducing the pressure in said water in said upper end of the casing D, whereby the stronger pressure of the water from the main I will instantly force the block K and its attached parts upward, thereby lifting the main valve plug J from its seat, and permitting the water under pressure from the main I to rush down through the cylinder B, and flush the bowl A. As soon as the auxiliary valve-plug Q is closed again (which is done by the pressure of the water in chamber R against the disk U and said plug Q, when the push-piece V is released from pressure) further flow of water from the casing D and flow pipe E is at once stopped, and then the block K, with its attachments, begins to descend by gravity, aided by the pressure of the water in the upper end of said casing D on the block N. As long as the main valve is open, water is continually passing up through the always open bore p in the needle-valve L, so that there is never any vacuum in said upper end of the casing D above the block N, the volume of water therein contained depending upon the position of the main valve.

A great advantage of my construction lies in the entire absence of springs and levers in both the main and the auxiliary valve and with the latter, should repair become necessary, then by reason of the construction of the described inner casing P, the same with the push-piece, valve-rod, and valve-plug, can all be removed bodily, by inserting a proper tool, such as a spanner, or compasses, in the holes r r in the top of said casing P, and this is especially convenient and desirable, as thereby the valve-seat (which is the lower end of the casing P) is withdrawn with the valve, thus obviating the necessity of grinding down the valve-seat, as might be necessary if the valve-seat remained in the stationary casing which was fixed to the floor or other structure.

As a matter of convenience, I term the described parts and attachments of my main valve, taken collectively, as the plunger, this including the blocks K and N, interposed flexible disk M, cup n and needle-valve L, as well as the valve-plug J; and similarly, I term the inner movable parts (push-piece V, packing-disk U, nut T, valve-rod S, and plug Q) of the auxiliary valve, when taken collectively, the core.

Another advantage of my invention lies in the fact that the said plunger of my main valve is always surrounded by water under pressure, whether said valve is open or closed, whereby all danger or liability of leakage between the packing-disk M and the main valve casing is entirely obviated, and further, with my device, the main and auxiliary valves are wholly independent in location, and may be separated to any distance required, which is of great advantage in many cases.

Having thus described my invention, what I claim as new, and desire to secure by Letters-Patent, is:—

1. The combination with a casing having a reduced lower part, forming a valve seat, a removable top, and an inlet pipe, above the valve-seat, for connection with the source of water-supply, of a plunger and valve freely and vertically movable in the upper part of said casing, and comprising a transversely bored block, with a communicating vertical bore, and an upward extending neck, a flexible disk surrounding said neck and forming a packing, another block, also surrounding said neck, and clamping said packing disk to place, a cup closing the upper end of said vertical bore and having a central opening in its bottom, a needle-valve formed with a vertical bore therethrough and adjustably secured within said cup, and a valve-plug rigidly secured to the underside of said transversely and vertically bored block; a flow pipe leading from the upper part of said casing above said valve, and a return pipe leading to the lower part of said casing below said valve-seat.

2. An outer valve casing having a water chamber in its lower part and a duct leading thereto from the outside, the interior of said casing above the water chamber being of reduced diameter, and said casing above the reduced part being formed with an annular recess or channel, and a communicating duct leading outwardly through said casing, in combination with an inner casing whose exterior conforms substantially to the interior configuration of said outer casing, and which has a vertical bore therethrough, reduced in diameter at its lower end where said inner casing is removably connected to the outer casing, just above the water-chamber in the latter, and an annular series of openings in line and communicating with the annular recess in the outer casing, the joints between the two casings being suitably packed: a push-piece having vertical movement within the bore of the inner casing; a valve rod secured to said push-piece and depending into said water chamber; a nut on said rod, and a flexible packing disk interposed between said nut and push-piece; and a valve-plug on the lower end of said valve-rod.

In testimony that I claim the foregoing I have hereunto set my hand at Milwaukee, in the county of Milwaukee and State of Wisconsin in the presence of two witnesses.

PETER F. MURPHY.

Witnesses:
H. G. UNDERWOOD,
B. C. ROLOFF.